US006693754B2

(12) United States Patent
Noble et al.

(10) Patent No.: US 6,693,754 B2
(45) Date of Patent: Feb. 17, 2004

(54) METHOD AND APPARATUS FOR A DISC DRIVE ADAPTIVE FILE SYSTEM

(75) Inventors: Gayle L. Noble, Boulder Creek, CA (US); Rick S. Shimizu, San Jose, CA (US); Jason P. Hanlon, Scotts Valley, CA (US)

(73) Assignee: Seagate Technology LLC, Santa Cruz, CA (US)

( * ) Notice: Subject to any disclaimer, the term of this patent is extended or adjusted under 35 U.S.C. 154(b) by 281 days.

(21) Appl. No.: 09/865,280

(22) Filed: May 24, 2001

(65) Prior Publication Data

US 2002/0015252 A1 Feb. 7, 2002

Related U.S. Application Data

(60) Provisional application No. 60/206,746, filed on May 24, 2000.

(51) Int. Cl.[7] .................................................. G11B 5/09
(52) U.S. Cl. ...................... 360/53; 360/78.04; 360/72.1; 714/770; 711/111
(58) Field of Search .................. 360/55, 53, 78.04, 360/72.2, 72.1, 54, 81, 49, 48; 714/701, 702, 769, 770, 5, 7, 8; 711/105, 200, 202, 206, 111, 112, 113

(56) References Cited

U.S. PATENT DOCUMENTS

| 5,890,209 A | * | 3/1999 | Dobbek ........................ 711/112 |
| 6,025,966 A | * | 2/2000 | Nemazie et al. ............... 360/53 |
| 6,034,831 A | * | 3/2000 | Dobbek et al. ................ 360/53 |
| 2001/0047451 A1 | * | 11/2001 | Noble et al. ................. 711/111 |

* cited by examiner

Primary Examiner—Alan T. Faber
(74) Attorney, Agent, or Firm—James A. Sheridan

(57) ABSTRACT

Aspects of the invention include a method and apparatus to optimize the location of data on a disc drive storage system by optimizing the physical location of the file to allow the read ahead memory cache to operate more efficiently. In one aspect, the disc drive uses a reserved area on the media to hold files during the optimization process. In another aspect, the drive includes an optimization table that stores optimized file access data to further enhance the drive performance.

19 Claims, 6 Drawing Sheets

| sector0 Reserved 1 PBA 0 head 0 | sector1 Reserved 2 PBA 1 | sector2 Reserved 3 PBA 2 | sector3 Reserved 4 PBA 3 | sector4 Reserved 5 PBA 4 | sector5 LBA 0 6 PBA 5 | sector6 LBA 1 7 PBA 6 |
|---|---|---|---|---|---|---|
| sector0 LBA 2 8 PBA 7 head 1 | sector1 LBA 3 9 PBA 8 | sector2 LBA 4 10 PBA 9 | sector3 LBA 5 11 PBA 10 | sector4 LBA 6 12 PBA 11 | sector5 LBA 7 13 PBA 12 | sector6 LBA 8 14 PBA 13 |
| sector0 LBA 9 15 PBA 14 head 2 | sector1 LBA 10 16 PBA 15 | sector2 LBA 11 17 PBA 16 | sector3 LBA 12 18 PBA 17 | sector4 LBA 13 19 PBA 18 | sector5 LBA 14 20 PBA 19 | sector6 LBA 15 21 PBA 20 |
| sector0 LBA 16 22 PBA 21 head 3 | sector1 LBA 17 23 PBA 22 | sector2 LBA 18 24 PBA 23 | sector3 LBA 19 25 PBA 24 | sector4 LBA 20 26 PBA 25 | sector5 LBA 21 27 PBA 26 | sector6 LBA 22 28 PBA 27 |
| sector0 LBA 23 29 PBA 28 head 4 | sector1 Bad 30 PBA 29 | sector2 Bad 31 PBA 30 | sector3 Bad 32 PBA 31 | sector4 LBA 24 33 PBA 32 | sector5 LBA 25 34 PBA 33 | sector6 LBA 26 35 PBA 34 |
| sector0 LBA 27 36 PBA 35 head 5 | sector1 LBA 28 37 PBA 36 | sector2 LBA 29 38 PBA 37 | sector3 LBA 30 39 PBA 38 | sector4 LBA 31 40 PBA 39 | sector5 LBA 32 41 PBA 40 | sector6 LBA 33 42 PBA 41 |
| sector0 LBA 34 43 PBA 42 head 6 | sector1 LBA 35 44 PBA 43 | sector2 LBA 36 45 PBA 44 | sector3 LBA 37 46 PBA 45 | sector4 LBA 38 47 PBA 46 | sector5 LBA 39 48 PBA 47 | sector6 LBA 40 49 PBA 48 |
| sector0 LBA 41 50 PBA 49 head 7 | sector1 LBA 42 51 PBA 50 | sector2 LBA 43 52 PBA 51 | sector3 LBA 44 53 PBA 52 | sector4 LBA 45 54 PBA 53 | sector5 LBA 46 55 PBA 54 | sector6 LBA 47 56 PBA 55 |

Figure 3 ically takes the form of a circular storage disc, e.g., media, having a plurality of recording tracks. Conventional disc drives include one or more vertically aligned storage discs, each with at least one magnetic head for reading or writing information to the media. Typically, the magnetic head is attached to a positioner arm assembly that uses a motor to align the magnetic head above a selected track on the disc. The location of the magnetic head is typically determined by a disc controller that is given the position of a data area on the disc to read or write data. The precise location and movement of the head is typically accomplished by incorporating a closed-loop electromechanical servo system with a dedicated servo region, or regions, used to provide high speed or continuous feedback to the system to maintain accurate positioning of the data head.

METHOD AND APPARATUS FOR A DISC DRIVE ADAPTIVE FILE SYSTEM

CROSS-REFERENCE TO A RELATED APPLICATION

This invention is based on U.S. Provisional Patent Application Ser. No. 60/206,746 filed May 24, 2000 entitled "Drive Based Adaptive File System" filed in the name of Gayle L. Noble, Rick S. Shimizu, and Jason P. Hanlon. The priority of this provisional application is hereby claimed.

U.S. patent application entitled "Drive Based Adaptive Defragmentation System" Ser. No. 09/865,927 filed on May 24, 2001, filed in the name of Gayle L. Noble, Rick S. Shimizu, and Jason P. Hanlon is hereby incorporated herein by reference in its entirety.

BACKGROUND OF THE INVENTION

1. Field of the Invention

The invention generally relates to storing and retrieving data on a disc drive.

2. Background of the Related Art

Disc drives are capable of storing large amounts of digital data in a relatively small area. Disc drives store information on one or more recording media. The recording media conventionally takes the form of a circular storage disc, e.g., media, having a plurality of recording tracks. Conventional disc drives include one or more vertically aligned storage discs, each with at least one magnetic head for reading or writing information to the media. Typically, the magnetic head is attached to a positioner arm assembly that uses a motor to align the magnetic head above a selected track on the disc. The location of the magnetic head is typically determined by a disc controller that is given the position of a data area on the disc to read or write data. The precise location and movement of the head is typically accomplished by incorporating a closed-loop electromechanical servo system with a dedicated servo region, or regions, used to provide high speed or continuous feedback to the system to maintain accurate positioning of the data head.

Generally, data is stored on the media in data sectors within each recording track, i.e., a cylinder. As the media is generally round, to maintain the data density the number of data sectors per each cylinder on the outer portion of the media is greater than the number of sectors found on cylinders located closer to the center portion of the media. The time needed to access and/or store data is known as the "seek time" and is generally a function of the closed loop electromechanical servo system to move the magnetic head (s) from one data sector to another. The outer cylinders typically have faster access as the positioner arm moves less to read and write data.

Due to their large storage capacity relative to other forms of electronic digital data storage, disc drives are often used by electronic systems such as computers to permanently or semi-permanently store applications, e.g., software programs, data, etc. The amount of data stored on disc drives is a function of the media density, size, and number of medias used. The applications are generally stored as files that are then used by an end user, or users, to perform tasks such as word processing, calculations, and the like. To assist the applications in locating a file, conventional computer operating systems generally use a layered directory structure. The conventional layered directory structures usually have a main directory and then sub directories where the files are stored. For example, using the DOS operating system, a file named "xyz" may be given a logical location such as "c:/xyz" indicating that the file is located on the "c" drive at the root directory "/".

To allow an application to find and use files on the media, each file is given a different logical location on the media by the computer operating system. Operating systems communicate with the disc drive using logical block addresses (LBA). When an application makes a request for a file from the operating system, the operating system uses the file name to look up the location in terms of a starting LBA and the number of LBAs needed to read or write the file. The LBA is then translated by internal disc drive software to the actual physical location on the disc drive, i.e., the physical block address (PBA). The PBA could include a number of data sectors depending upon the physical to logical translation being used by the host software. The translation from LBA to PBA is necessary to allow the disc drive to implement a defect management scheme and to set aside reserved areas on the media for manufacturer specific data not generally accessible to the operating system such as disc drive operating firmware, etc.

Generally, as files are written to the media, the files are stored in free LBAs. Ideally, the free PBAs may be contiguous, but as files are added and deleted during normal drive operation files may be stored randomly across the media as fragmented files. Additionally, on a multiple disc media, the file may be stored on different discs. Unfortunately, as the seek times are a generally a function of the amount of time for the positioner arm to move to a new location, fragmented files may cause a decrease in drive performance as the head is moved to access the files. Additionally, differing file types may require different storage requirements. For example, some applications assume that an audio/video file require a special partition separating the normal application data audio files from the video files. This requires that the host software make a logical estimate as to the size of partition needed thereby over, or under compensating for the space needed. Thus, as the PBA and LBA locations of the various files may not be optimum for a particular application, drive performance may suffer.

As the drive read and writes data to the media, the positioner arm moves the head(s) to different media locations related to each application. The faster the head is moved and finds the location the better the drive performance. Unfortunately, improving the speed of head movement on conventional drives having a limited mechanical capacity for movement requires upgrading the positioner and motor circuitry to increase the seek speed of the head(s). This adds cost to the disc drive.

Buffer memory (e.g., cache memory) is used to store data in advance to allow the head time to move to the next file location. Depending upon the type of data being retrieved, the head may move either too slowly, allowing the media to "spin a rev", i.e., rotate one or more times without reading data, until the head has located the proper data address, or move too quickly causing the head to be idle or spin without usage, while the buffer memory is purged. In either case, the idle time caused adds to the drive seek time and thus lowers drive performance. To minimize the effect of a drive being "too slow" or "too fast" the buffer sizes and access speeds may be increased. However increasing buffer memory performance also generally increases the cost of the disc drive. Further, it may be increasingly difficult to optimize the memory size to accommodate a variety of different applications, file types, sizes, etc.

Thus, what is needed is a method that allows for effective and adaptable file storage on a disc drive that optimizes the performance of the disc drive.

SUMMARY OF THE INVENTION

Aspects of the invention have particular advantages in electronic data storage systems. In one embodiment, the invention provides a method of determining data locations on a disc drive media, including providing a first association for a second data location on at least one media to a first data location then requesting to read data from the second data location, reading the data from the second data location, then determining if the first association is correct, and if the first association is correct then processing the data from the second data location, however; if the first association is incorrect, then determining a correct second data location, and modifying the first association into a second association comprising the correct second data location.

In another aspect, the invention provides a method of locating data on a disc drive, including determining a data location on at least one media to read from, determining if data within a data location is correct, if the data is correct then reading and processing the data, and if the data is incorrect then determining a new data location having the correct data.

In still another aspect, the invention provides a disc drive system including a signal-bearing media means for storing data, a code memory means coupled to a read/write controller means for controlling the reading and writing of data to the signal-bearing media, a means for reading and writing the data to the signal-bearing media, a processor means coupled to the code memory and the read/write controller comprising a program for optimizing the data location on the signal-bearing media means.

BRIEF DESCRIPTION OF THE DRAWINGS

So that the manner in which the above recited features, advantages, objects, and aspects of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

FIG. 3 illustrates conventional storage locations on a media with respect to LBAs and PBAs.

DETAILED DESCRIPTION OF THE PREFERRED EMBODIMENT

Aspects of the invention have particular advantages in electronic data storage systems. One exemplary electronic data storage system commonly used in the computer industry, well suited for supporting the optimization method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of aspects of the invention, represent alternative embodiments of the invention. It may also be noted that portions of the product program may be developed and implemented independently, but when combined together constitute embodiments of the invention.

Figure 1:
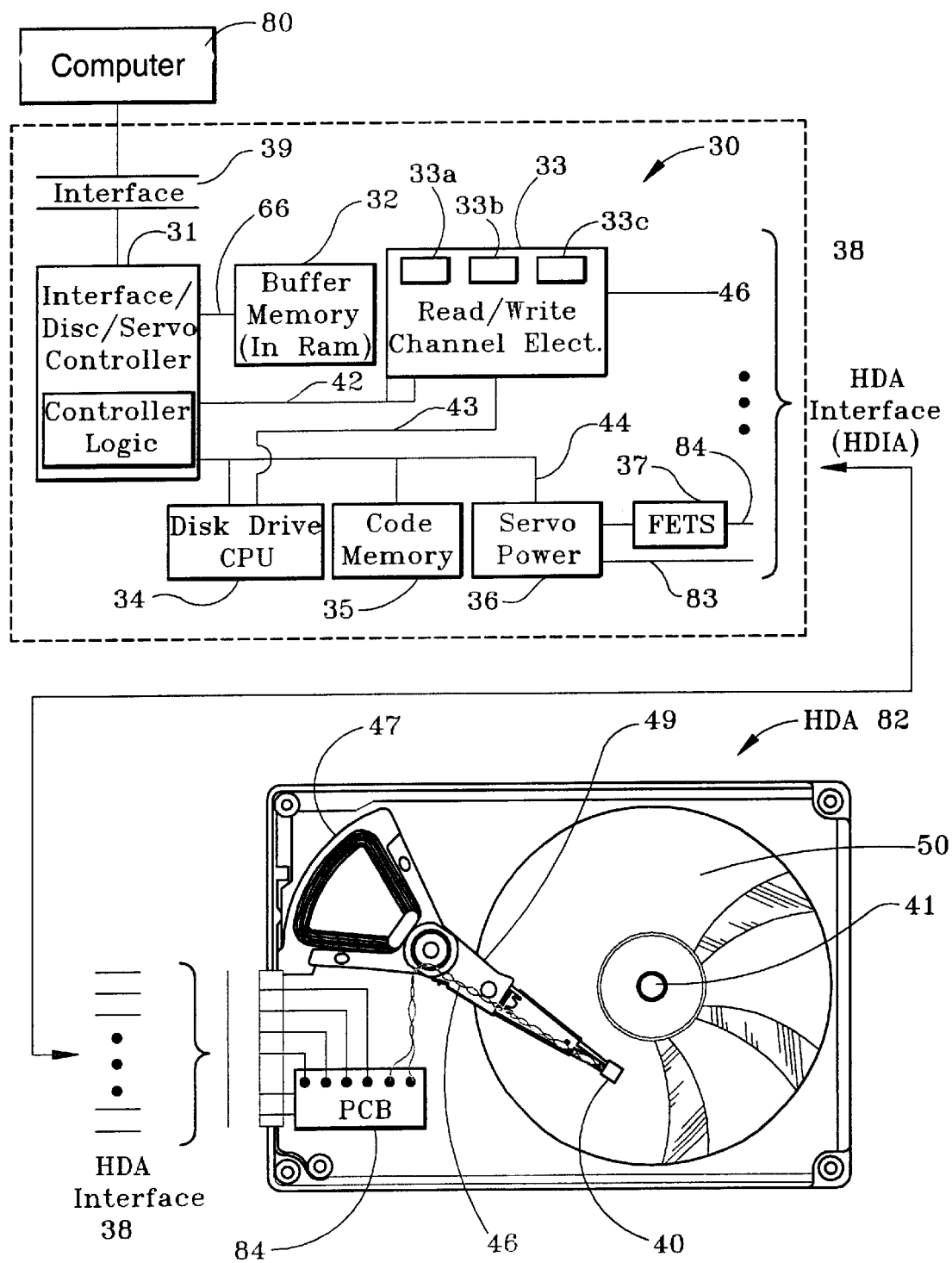
FIG. 1 is a plan view of a conventional disc-based apparatus for reading and writing data on a media wherein aspects of the invention may be used to advantage.

FIG. 1 is a plan view of a typical disc-based apparatus for reading and writing data on a media 50 wherein aspects of the invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above the media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information. A computer 80 of any conventional design includes an operating system adapted to receive digital information communicate with the disc drive electronics 30 through interface 39.

The interface/disc/servo controller 31 provides a translation and command interface between the computer 80 and disc drive electronics 30 through the interface 39. The interface/disc/servo controller 31 is directly connected to the buffer memory 32 through a memory bus connection (36. The buffer memory 32 may store program code and/or data for use with the operation of the drive. Interface/disc/servo controller 31 is also connected via a read/write bus 44 to a CPU 34 used for processing the disc drive commands, a code memory 35 adapted to store operational data and commands, and the servo power electronics 36, adapted to operate the servomotor 41 and actuator arm 49. Servo power electronics 36 are typically connected to the HD 82 via servo control connection PCBA 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 include read write logic 33a, write logic 33b, and servo logic 33c, and includes a connection to the interface/disc/servo controller 31 through the data bus 42 and a connection to the read/write head(s) 40 through read/write line 46. A serial bus 43 is used to send configuration commands from the CPU 34 to the read/write channel electronics 33.

FIG. 1 is merely one hardware configuration for a disc-drive data storage system. Aspects of the invention can apply to any comparable hardware configuration, regardless of whether the disc-drive data storage apparatus is a complicated, multi-media storage apparatus including a plurality of media types, or a single disc-drive data storage apparatus.

Figure 2:
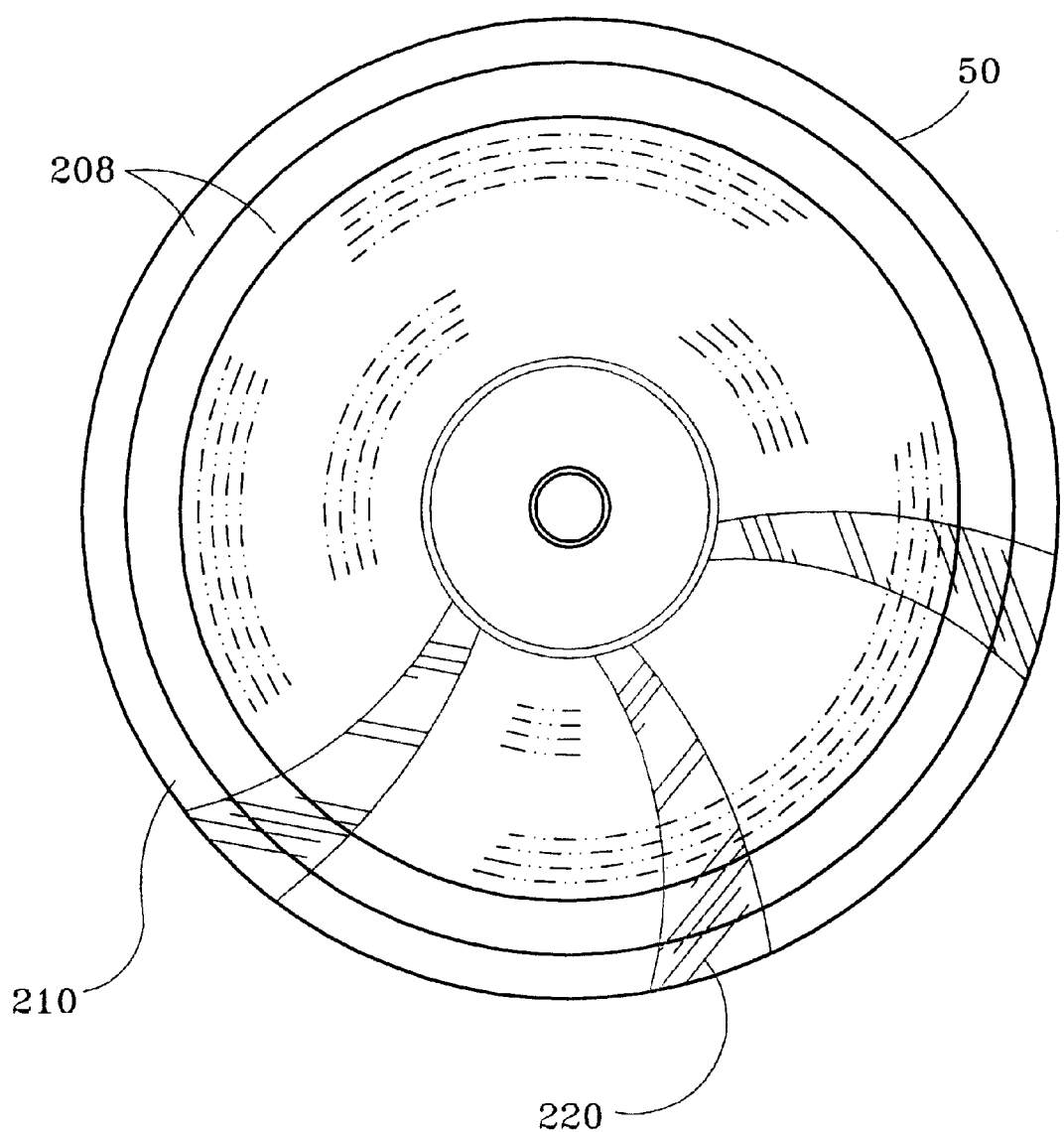
FIG. 2 is a plan view of conventional media for storing data wherein aspects of the invention may be used to advantage.

FIG. 2 is a plan view of the media 50 for storing data wherein aspects of the invention may be used to advantage. FIG. 2 illustrates data storage tracks 208 on the media 50 including data wedges 210 separated by a plurality of servo wedges 220 in accordance to the invention. As necessary, FIG. 1 is referenced in the following discussion of FIG. 2. For clarity, only portions of the tracks 208 are shown. Illustratively, a plurality of the tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user. The servo wedge 220 includes digital data that identifies the particular track (e.g., cylinder) and the sector. The servo wedge also includes area(s) of precisely placed magnetic bursts where the relative amplitude when read from the read/write head(s) 40, indicates the position of the head relative to the track center. Additional fields may be written into the servo wedge 220 as desired by the manufacturer.

FIG. 3 illustrates data stored on a media 50 includes eight media surfaces each surface having a read/write head 40 and fifty six storage blocks. The read/write head 40 for the first media is denoted as read/write head zero, the second media has read/write head one, and so on. In this example, each media surface has one cylinder i.e., one track 208. Each cylinder can hold seven data sectors sector zero through sector six. Data communicated to and from a data storage system is normally managed by the LBA rather than by the PBA. Data sectors are numbered blocks of data to be stored and retrieved. Data sectors are the fundamental units of data handled by the data storage system and are usually of fixed length, e.g., 512 bytes. In one aspect, one data sector equals the length of one data wedge 210. However, if the data wedges 210 are large, as is often the case with magnetic storage systems, several logical addressed data sectors may be stored in a single physical data wedge 210. In this example, ideally the media 50 would have fifty-five LBAs and fifty-five PBAs where each PBA would have an identical LBA. However, due to the media defects, for PBAs thirty through thirty-two, and the reserved blocks one through five, only forty-seven LBAs are available to the operating system. The LBAs are adjusted to conform to the available PBAs. For example, a fragmented file may be viewed by the operating system as contiguous, spanning block twenty-nine through block thirty-five, with LBAs twenty-three through twenty-six, but due to the defect blocks thirty through thirty-two, PBA thirty-six, PBA thirty-seven, and PBA thirty-eight are not used leaving the file physically fragmented. Contiguous PBA blocks would be located on a single media such as head 1 sector zero through six.

Figure 4:
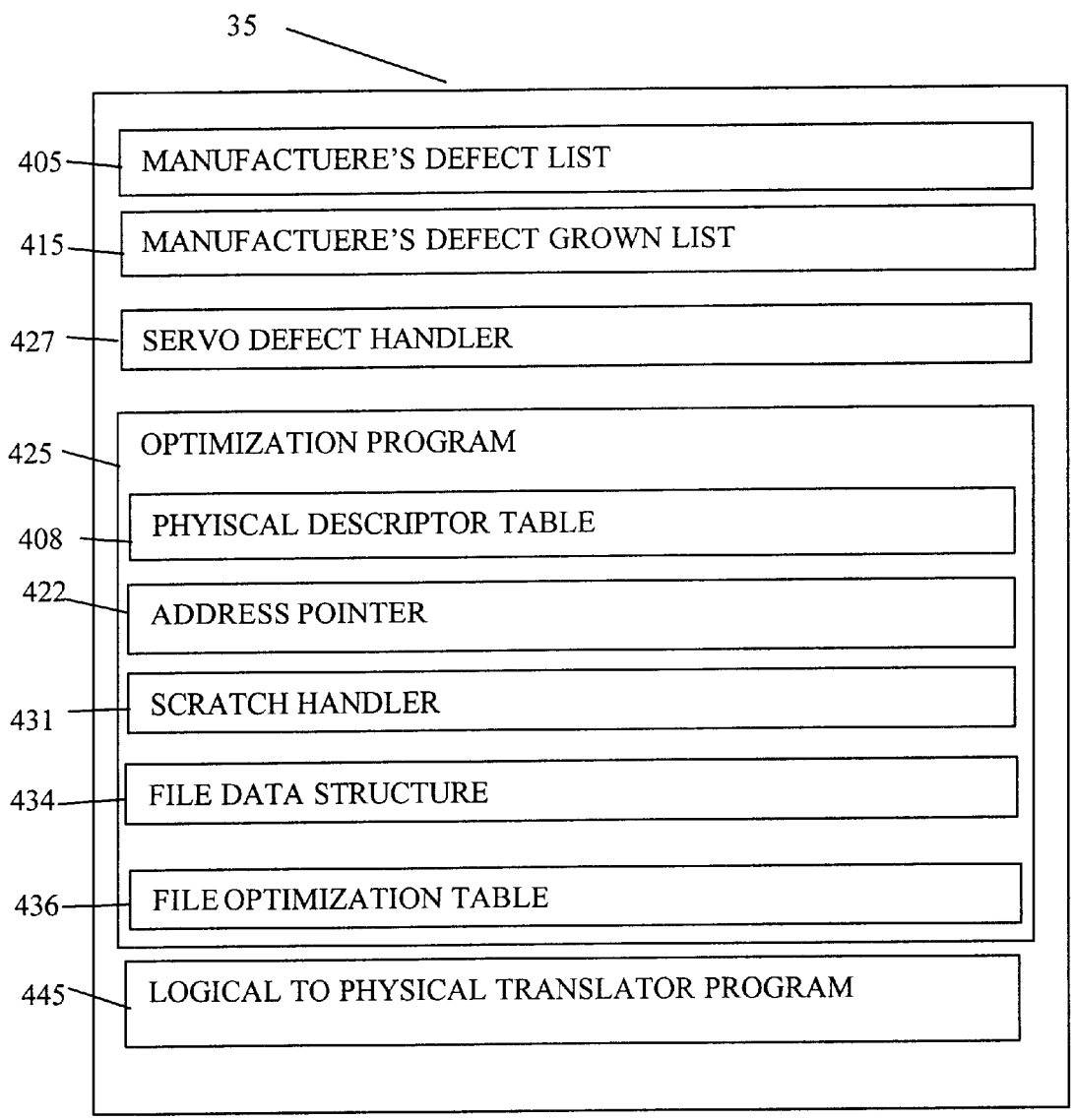
FIG. 4 illustrates a memory core for storing programming data in which aspects of the invention may be used to advantage.

FIG. 4 illustrates the code memory 35 for storing programming data in which embodiments of the invention may be used to advantage. The code memory 35 is preferably random access memory sufficiently large to hold the necessary programming and data structures of the invention. The code memory 35 may be used to store operating code, and other run-time code that enables the drive. For redundancy, the contents of the code memory 35 may also be stored to a plurality of reserved areas of the media 50 or into other areas of the drive electronics 30 such as buffer memory 32.

During manufacture, the recording media 50 is usually written to and then read back from to determine which PBAs are defective. As part of the process of converting a logical block address to a PBA on the media 50 two lists are stored in code memory 35, a manufacturer's defect list 405 and a physical descriptor table 408. The physical descriptor table 408 generally includes servo data that indicates how many bytes of data may be written between each servo wedge 220 and may indicate if the servo wedge 220 is to be skipped. Additionally, the physical descriptor tables 405 may indicate that a zone needs to be skipped, as there may be a very large defect in the media 50 covering more than one data wedge 210 within a zone. The manufacture's defect list 405, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation and physically damaging a data sector on the media 50. Media defects subsequent to the manufacturer's defect list 405 are placed in the manufacturer's defect grown list 415. Thus, the manufacturer's defect grown list 415 literally "grows" as the media 50 is used.

The code memory 35 further includes a logical to physical translation program 445 adapted to translate the LBA to the physical data location on the media 50 i.e., the PBA. The physical translation program 445 coordinates the translation of the logical address of a particular block of data to the physical address of the location at which the data is stored. The logical to physical translator program 445 uses the physical descriptor table 408, the manufacturer's defect list 405, and manufacturer's defect grown list 415 to determine if the requested sector(s) have moved due to defects during a read or write sequence. The code memory 35 also includes an address pointer 422 used to point the logical to physical translation program 445 to the physical descriptor table 408. The code memory 35 further includes a servo defect handler code 427 used to manage defective servo wedges 220. The data written after a defective servo wedge is generally unreliable. Therefore, the servo defect handler code 427 allows the disc drive to skip defective servo wedges 220 when needed.

The code memory 35 further includes an adaptive file program 425. The adaptive file program 425 is adapted to perform an optimization process to optimize drive performance under varying system criteria, such as file type, file size, seek times, cache usage, and the like. In one aspect, the adaptive file program 425 uses a scratch handler program 431 to write files to reserved areas on the media 50 during the file optimization process described below. As files are optimized, changes to the file structures are saved in a file optimization table 436 to allow the adaptive file program 425 to store file access behavior and use the behavior to increase disc drive performance by locating files in an optimum location for disc drive access.

In another aspect, the adaptive file program 425 uses a file data structure 434 to establish the LBA locations of the files. The file locations are then converted to PBA by the logical to physical translator program 445. The LBA locations may be obtained from the operating system as a copy of the file allocation table, or from a drive-based file system. In either case, the adaptive file program 425 uses the file data structure 434 to locate each file on the media 50 during the optimization process. As files are optimized, the file data structure 434 and the file optimization table 436 are updated as described below to reflect the new file locations and file access parameters such as optimum starting LBA from specific ending LBA locations.

Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 5:
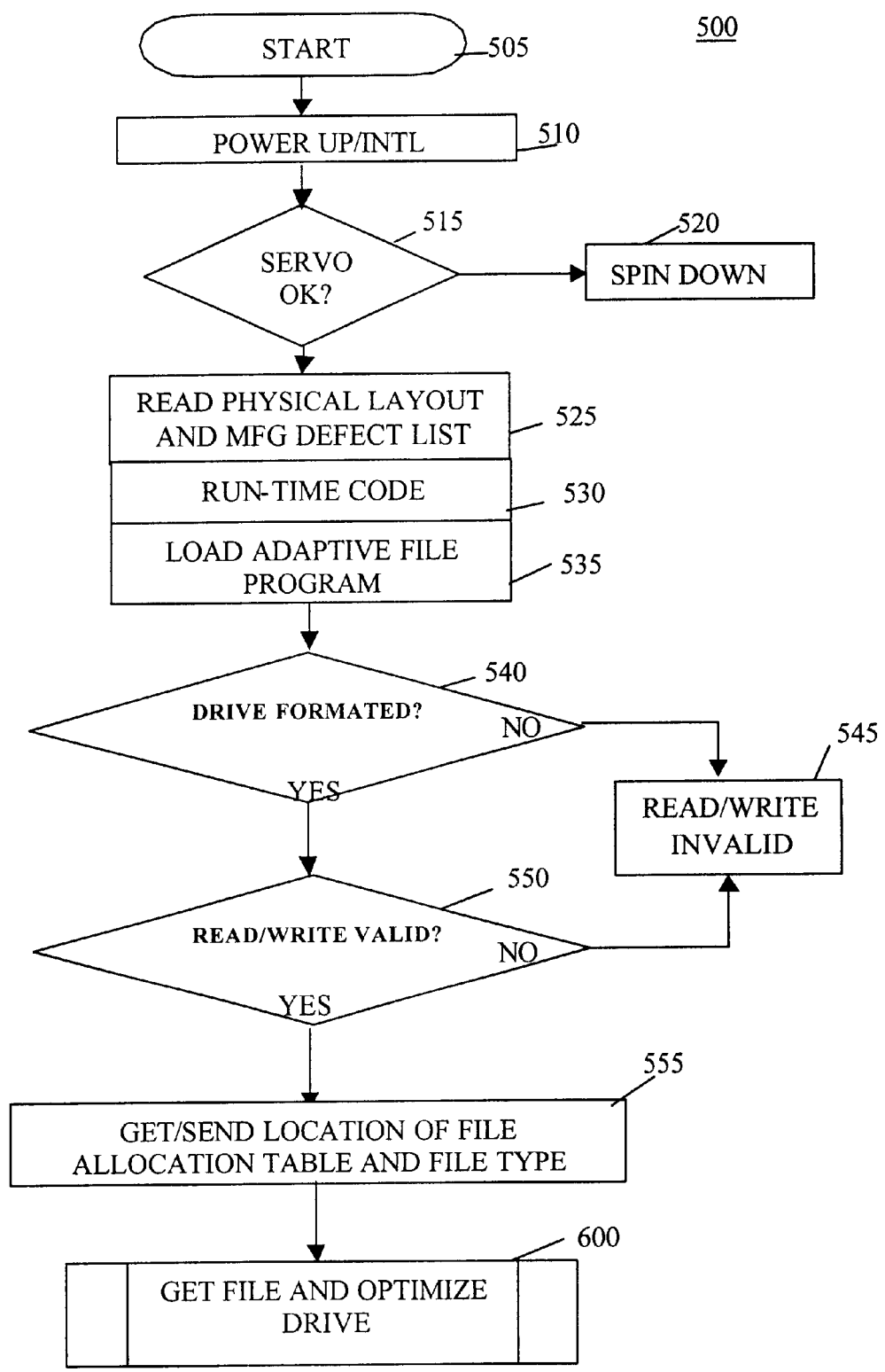
FIG. 5 is a flow diagram of a method for a start-up sequence for the disc-based apparatus of FIG. 1 in accordance with aspects of the invention.

FIG. 5 is a flow diagram of a method 500 for a start-up sequence for the disc-based apparatus of FIG. 1 in accordance with the invention. As necessary, FIGS. 1-4 are referenced in the following discussion of FIG. 5.

FIG. 5 is entered at step 505 when for example the computer 80 instructs the disc drive electronics 30 to read or write data to the media 50. At step 510, the interface/disc/servo controller 31 initializes the disc drive electronics 30, CPU 32, the code memory 35, the servo power 36, FETs 37, the read/write channel electronics 33, and the buffer memory 32 and begins the process of "spinning", i.e., rotating, the media 50 up to prepare the media 50 for a read or write operation. At step 515, the method 500 determines whether the servomotor 41 is functioning properly. If the servomotor 41 is working improperly, the servomotor 41 spins down at step 520. If the servomotor 41 is functioning properly, at 525 the actuator arm 49 positions the read/write transducer head(s) 40 and reads the manufacturer's defect list 405 and physical descriptor table 408 stored within a reserved area within memory and/or on the media 50 such as a reserved area on a servo wedge 220. At step 530, run-time code such as the address pointer 422, the servo defect handler 427, logical to physical translator program 445, and the like, are loaded into the code memory 35 from the media 50 and/or memory into a separate data location to allow the normal operation of the drive. At step 535, the adaptive file program 425 is loaded into code memory 35 from the media 50 and/or memory. At step 540, the media 50 is checked if it is properly formatted to receive data from the read/write transducer head(s) 40. If the media 50 is not properly formatted, then at 545, the read/write commands are set to invalid. If the read/write commands at step 550 where set to invalid from step 545, then the drive would be unable to be used for storing or retrieving data from the data wedges 210. If the media 50 is properly formatted, the method 500 proceeds to step 555 to get the file allocation table and file types either from the operating system or from the disc drive file system. Subsequently, method 500 then proceeds to step 600 to receive a file location to read from the media 50 and optimize the drive as described below.

Figure 6:
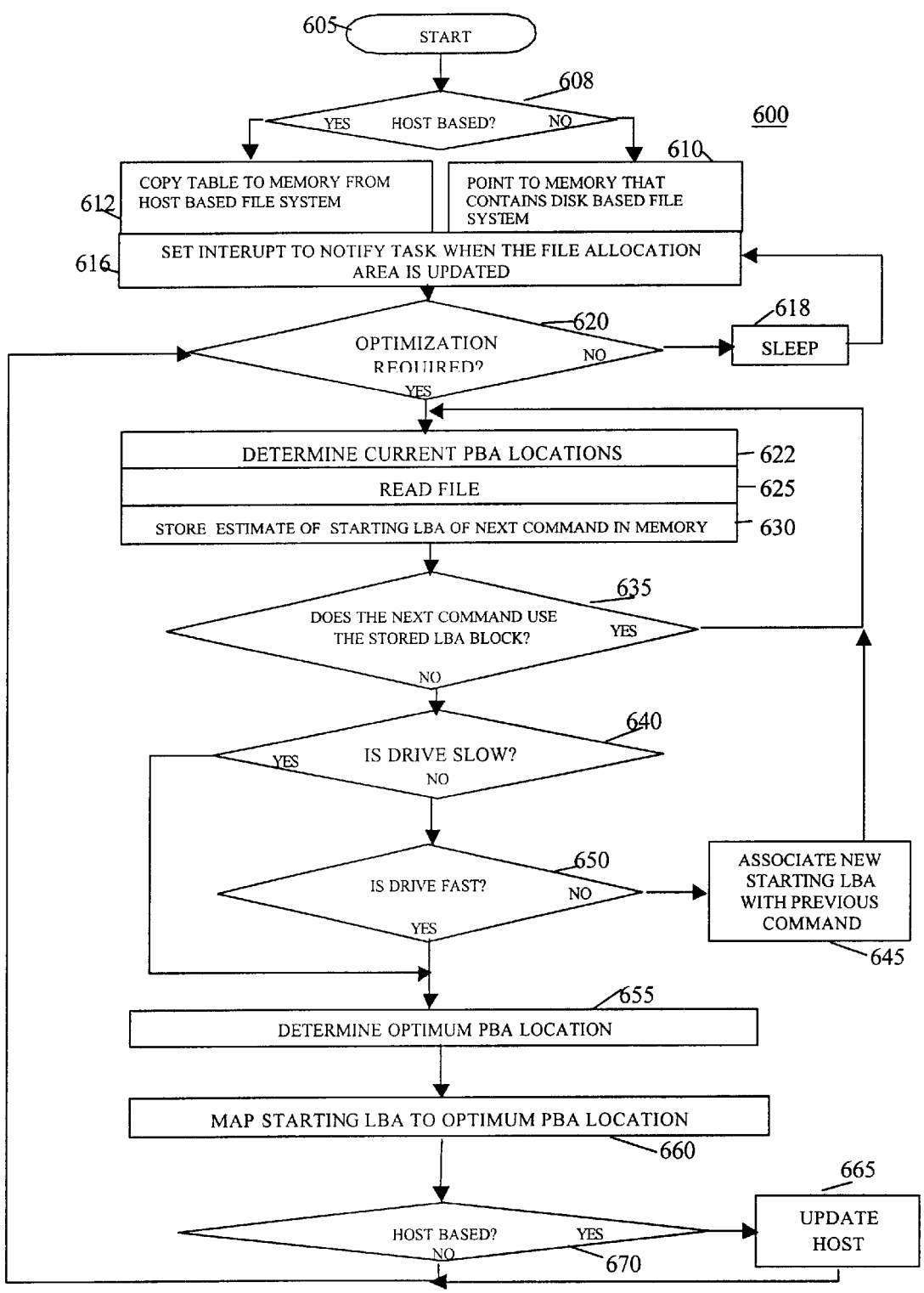
FIG. 6 is a flow diagram of a method for an adaptive file system on a disc-based apparatus of FIG. 1 in accordance with aspects of the invention.

FIG. 6 is a flow diagram of a method 600 for a method of optimizing data on the media 50 of FIGS. 1 and 2 in accordance with the invention. As necessary, FIGS. 1–5 are referenced in the following discussion of FIG. 6.

FIG. 6 is entered at step 605 when the optimization step is initiated from step 600. At step 608 the method 600 determines if the file allocation is provided by the operating system, i.e., host-based, or from the disc drive file system. If the file allocation is host-based, a copy of the file allocation table is copied from the media into the file data structure 434. If the file allocation table is from the disc drive, a copy of the file allocation table from the disc drive file system is copied to the file data structure 434 and the address pointer 422 is set to point to the file data structure 434. An interrupt is set to detect a change in the file allocation tables when file locations are updated at step 616.

At step 620, the method 600 determines if disc drive optimization is necessary. In one aspect, disc drive optimization is defined as mapping the LBA for the files to the optimum PBA location. If the file does not require optimization, i.e., the drive is optimized, then method 600 is put on hold, e.g., to sleep until optimization is required at step 618. The method 600 is reinitialized at step 616 upon detection of a file allocation change. If optimization is required, the current PBAs locations are determined at step 622. At step 625, the method 600 parses a read command from the computer 80, and begins to read the first LBA block of the file location set by a read command. Files are then read from the media 50 according to the command. At step 630, the method 600 determines the next logical starting LBA depending upon parameters of the previous parsed command. For example, if the command was to read a media file, the next command may be to read a play list of the media file. Based on this logical determination, the method 600 moves the read/write head(s) 40 to the logical LBA starting location and reads the LBA block into memory such as buffer memory 32.

At step 635, the method 600 determines if the LBAs loaded into memory such as buffer memory 32 at step 630 are correct. If the LBAs are correct, then the method 600 returns to step 622 for the next logical determination. If the determination was incorrect, e.g., the stored LBAs were incorrect for the next command, or the memory is unavailable, then the speed of the drive is checked at step 640 to see if the drive is too slow at step 640, or too fast at step) 650. If the drive is too slow, the location is correct but the drive may have to spin idly until the data is located thereby leaving the memory empty. In one aspect, to determine the drive speed is too slow at step 640, the method 600 determines if the memory was ready to receive new files but the heads 40 were physically behind, e.g., the memory may not be ready if the read/write head(s) 40 were not in the proper location due to a longer than expected seek time, or in another aspect, the memory was empty due to faster data transfer over bus 42. If the drive was too slow, then the method 600 proceeds to step 655 as described below to optimize the LBA and PBAs for the next command.

If the drive speed was not too slow, then the drive speed is checked to see if it is too fast at step 650. If the drive is too fast for the buffer 42, then the drive may have to spin idly until the data is ready for loading. If the drive is slow enough then the media 50 may have to spin more than one revolution, i.e., "spin a rev", until the data is ready for loading. In one aspect, to determine if the drive speed is too fast, the method 600 checks to see if the data within the memory is still the data required for the current command. In another aspect, the memory checks to see if the drive is ready to accept the new data for the next command but has physically passed the starting PBA for the next command causing the drive to skip a rev. If the memory is not ready to accept the new data or the data is still the same, then method 600 proceeds to step 655 described below to optimize the LBAs and PBAs, for the next command. If the memory is ready to accept the data for the next command, but was reading the wrong starting LBA, then the logical LBA determination from step 630 was incorrect and method 600 proceeds to reset the logical association of the next command to a new association for the correct LBA for the next command. Therefore, when the current command is called during a future operation, the new logical determination will be invoked, and the proper starting LBA will be stored in memory for the next command. For example, using method 600 and referring to FIG. 3, consider the case where the current command is a read media command for LBA eight (PBA thirteen) and the current logical determination for the next command is to read into memory LBA fifteen (PBA twenty) but the actual location of the next command data is LBA eleven, therefore, the logical determination is incorrect. Where the logical determination is incorrect, method 600 changes the logical association for the current command to read the correct LBA in preparation for the next command. For example, the current LBA association would be changed from LBA fifteen to LBA eleven. In one aspect, the associations are stored in file optimization table 436.

The optimum LBA and PBA mapping is determined at step 655. In one aspect, the drive speed is used to determine the optimum LBA to PBA mapping. For a drive that is determined too slow at step 640, the method 600 maps the LBA to a new PBA that will be in the correct physical position when needed regardless if the PBA or LBA are fragmented across the media 50. For example, referring to FIG. 3, if the current location of the read/write head(s) 40 is LBA zero (PBA five), and the current location of the next command data is at LBA two (PBA seven) the seek time is greater than if the next command starting LBAs are located at LBA one (PBA six). The seek time is increased by the fact that head one is used to read PBA five, and that head two is reading PBA seven. To optimize the location of the data at PBA seven, the method 600 moves the data in PBA six to another location, scratch area, and the like, and then moves the data from PBA seven to PBA six. The method 600 updates the physical descriptor table to reflect the change. As the new location of the data for the next command is physically closer and the memory was ready to accept the data, while the data for the current command is being transmitted over the bus 42, the data for the next command is being stored in memory. Thus, regardless of file fragmentation by locating the data in an optimum location, the data flow into and out of the memory is effectively synchronized with the physical location of the data.

For a drive that is too fast, the method 600 maps the LBAs to optimum PBAs minimizing the number of idle revolutions, fragmentations required, or different media 50 and head(s) 40 needed to give the drive time to be about aligned with the proper data location. For example, referring to FIG. 3, if the current location of the read/write head(s) 40 is LBA zero (PBA five), and the current location of the next command is at LBA 1 (PBA six) the seek time is less than if the next command LBAs are located at LBA two (PBA seven), as PBA zero and PBA seven are physically further apart than PBA five and PBA six, the drive may spin a rev in order to give the memory enough time to allow access to the memory. Thus, the seek time is decreased by the fact that head one is used to read PBA five and P13A six. To optimize the location of the data at PBA six, the method 600 moves the data in PBA seven to another location such as the reserved area, and the like, and then moves the data from PBA six to PBA seven. The method 600 updates the physical descriptor table to reflect the change. As the new location of the data for the next command is physically farther the seek time is longer, allowing the memory more time to send the data across the bus 42, allowing the memory time to become accessible. Thus, if the seek time is long enough, the memory has enough time to send the data across the bus 42 before reading PBA seven, allowing the data from PBA seven to be loaded into memory without spinning a rev. If the seek time is insufficient in length, then method 600 continues to move the file to other PBAs until the read ahead of the next command LBAs is about synchronized. At step 660, once the optimum PBA location is determined, then the LBAs are mapped to the PBAs for that current command and the optimization table is updated. Subsequently, at step 670, for a host-based system, the file allocation table updates are sent to the operating system for processing.

Although various embodiments which incorporate the teachings of the invention have been shown and described in detail herein, those skilled in the art can readily devise many other varied embodiments within the scope of the invention. For example, the memory may include combinations of the buffer memory 32, the media 50, or an external read ahead memory.

In summary, aspects of the invention have particular advantages in electronic data storage systems. In one embodiment, the invention provides a method of establishing data locations on a disc drive media 50, including providing 622 a first association for a second data location on at least one media 50 to a first data location then requesting to read data from the second data location, reading 625 the data from the second data location, then determining if the first association is correct, and if the first association is correct then processing 635 the data from the second data location, however; if the first association is incorrect, then determining 655 a correct second data location, and modifying the first association into a second association comprising the correct second data location. In another aspect, the correct second data location is on a second media. Additionally, determining if the first association is correct includes comparing 635 the stored data 436 to expected data. Further, determining a correct second data location includes determining 640,650 the minimum number of idle media revolutions to locate and access the correct second data location where when the reading is requested and the media spins at least one idle revolution before reading then moving the correct second data location, where when the reading is requested the media spins less than one idle revolution before reading. In addition, where if the media spins at least one idle revolution before the reading is requested, then moving 660 the correct second data location where the media spins a minimum number of idle revolutions before the reading is requested. Further, where, prior to the step of reading the data from the second data location then determining 655 the position of a read/write head with respect to the location of the second data location and if different than the second data location then determining the current data location of the head and moving the correct second data location to about the current data location.

In another aspect, the invention provides a method of establishing data locations on a disc drive, including determining 622 a data location on at least one media 50 to read from, determining if data within a data location is correct 635, if the data is correct then reading 625 and processing the data, and if the data is incorrect then determining a new data location having the correct data 645. In addition, where determining the data location to read from includes processing a data command and associating the data location to the command where if the association is incorrect then establishing a new association 645 between the command and the new data location. In addition, wherein establishing the new association 645 between the command and the new data location includes updating 645 the association to reflect the new association. Further, including determining if the new association is an optimum data location 655 whereby the media 50 revolves a minimum number of idle revolutions to access the new data location where determining if the new association is the optimum data location whereby the media 50 revolves a minimum number of idle revolutions to access the new data location includes determining 655 a read/write head position, then moving 660 the new data location until the read/write head position is about aligned with the new data location when reading commences.

In still another aspect, the invention provides a disc drive system including a signal-bearing media means 50 for storing data, a code memory means 35 coupled to a read/write controller means 33 for controlling the reading and writing of data to the signal-bearing media 50, a means for reading and writing the data to the signal-bearing media 40, a processor means 34 coupled to the code memory 35 and the read/write controller 33 including a program for optimizing the data location on the signal-bearing media means 50 where the program when executed by the processor means 34 performs the steps of determining 622 a data location on at least one media 50 to read from, then determining if data within a data location is correct, then, if the data is correct then reading 625 and processing the data, and if the data is incorrect then determining 645 a new data location having the correct data. In addition, where determining the data location to read from includes processing a data command and associating 635 the data location to the command where if the association is incorrect then establishing a new association 645 between the command and the new data location. Further, where establishing the new association between the command and the new data location includes updating 645 the association to reflect the new association and further including determining 655 if the new association is an optimum data location whereby the media 50 revolves a minimum number of idle revolutions to access the new data location where determining 655 if the new association is the optimum data location whereby the media revolves a minimum number of idle revolutions to access the new data location includes determining a read/write head position 655 and moving the new data location until the read/write head position is about aligned with the new data location when reading commences.

While foregoing is directed to the various embodiments of the invention, other and further embodiments of the invention may be devised without departing from the basic scope thereof, and the scope thereof is determined by the claims that follow.

What is claimed is:

1. A method of establishing data locations on a disc drive media, comprising:

providing a first association for a second data location on at least one media to a first data location;

requesting to read data from the second data location;

reading the data from the second data location;

determining if the first association is correct if the first association is correct ten processing the data from the second data location;

if the first association is incorrect, then determining a correct second data location; and modifying the first association into a second association comprising the correct second data location.

2. The method of claim 1 wherein the correct second data location is on a second media.

3. The method of claim 1, wherein determining if the first association is correct comprises comparing the stored data to expected data.

4. The method of claim i, wherein determining a correct second data location comprises determining the minimum number of idle media revolutions to locate and access the correct second data location.

5. The method of claim 4, wherein when the reading is requested and the media spins at least one idle revolution before reading then moving the correct second data location wherein when the reading is requested the media spins less than one idle revolution before reading.

6. The method of claim 4, wherein if the media spins at least one idle revolution before the reading is requested, then moving the correct second data location wherein the media spins a minimum number of idle revolutions before the reading is requested.

7. The method of claim 4, wherein, prior to the step of reading the data from the second data location, determining the position of a read/write head with respect to the location of the second data location and if different than the second data location then determining the current data location of the head and moving the correct second data location to about the current data location.

8. A method of establishing data locations on a disc drive, comprising:

determining a data location on at least one media to read from;

determining if data within a data location is correct;

if the data is correct then reading and processing the data; and if the data is incorrect then determining a new data location having the correct data.

9. The method of claim 8, wherein determining the data location to read from comprises processing a data command and associating the data location to the command wherein if the association is incorrect then establishing a new association between the command and the new data location.

10. The method of claim 9, wherein establishing the new association between the command and the new data location comprises updating the association to reflect the new association.

11. The method of claim 9, further comprising determining if the new association is an optimum data location whereby the media revolves a minimum number of idle revolutions to access the new data location.

12. The method of claim 11, wherein determining lithe new association is the optimum data location whereby the media revolves a minimum number of idle revolutions to access the new data location comprises determining a read/write head position.

13. The method of claim 12, further comprising moving the new data location until the read/write head position is about aligned with the new data location when reading commences.

14. A disc drive system comprising:

a signal-bearing media means for storing data;

a code memo mea led to a read/write controller means for controlling the reading and writing of data to the signal-bearing media;

means for reading and writing the data to the signal-bearing media;

a processor means coupled to the code memory and the read/write controller comprising a program for optimizing the data location on the signal-bearing media means, wherein the program when executed by the processor means performs the steps of:

determining a data location on at least one media to read from;

determining if data within a data location is correct;

if the data is correct then reading and processing the data; and if the data is incorrect then determining a new data location having the correct data.

15. The system of claim 14, wherein determining the data location to read from comprises processing a data command and associating the data location to the command wherein if the association is incorrect then establishing a new association between the command and the new data location.

16. The system of claim 15, wherein establishing the new association between the command and the new data location comprises updating the association to reflect the new association.

17. The system of claim 15, further comprising determining if the new association is an optimum data location whereby the media revolves a minimum number of idle revolutions to access the new data location.

18. The system of claim 17, wherein determining if the new association is the optimum data location whereby the media revolves a minimum number of idle revolutions to access the new data location comprises determining a read/write head position.

19. The system of claim 18, further comprising moving the new data location until the mad/write head position is about aligned with the new data location when reading commences.

* * * * *